US010331592B2

United States Patent
Fernald

(12) United States Patent
(10) Patent No.: US 10,331,592 B2
(45) Date of Patent: Jun. 25, 2019

(54) COMMUNICATION APPARATUS WITH DIRECT CONTROL AND ASSOCIATED METHODS

(71) Applicant: Silicon Laboratories Inc., Austin, TX (US)

(72) Inventor: Kenneth W. Fernald, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 454 days.

(21) Appl. No.: 15/168,002

(22) Filed: May 28, 2016

(65) Prior Publication Data

US 2017/0344502 A1 Nov. 30, 2017

(51) Int. Cl.

| | |
|---|---|
| ***G06F 13/36*** | (2006.01) |
| ***G06F 13/364*** | (2006.01) |
| ***G06F 1/3234*** | (2019.01) |
| ***G06F 13/42*** | (2006.01) |
| *G06F 13/40* | (2006.01) |
| *G06F 1/3287* | (2019.01) |
| *G06F 1/3237* | (2019.01) |
| *G06F 1/324* | (2019.01) |

(52) U.S. Cl.

CPC .......... *G06F 13/364* (2013.01); *G06F 1/3243* (2013.01); *G06F 13/4282* (2013.01); *G06F 1/324* (2013.01); *G06F 1/3237* (2013.01); *G06F 1/3287* (2013.01); *G06F 2213/0016* (2013.01)

(58) Field of Classification Search

CPC .. G06F 13/364; G06F 13/4282; G06F 1/3243; G06F 1/3287; G06F 2213/0016

USPC .......................................................... 710/110

See application file for complete search history.

(56) References Cited

U.S. PATENT DOCUMENTS

| | | | | |
|---|---|---|---|---|
| 5,481,415 | A * | 1/1996 | Oguro | G11B 20/00 360/132 |
| 6,954,809 | B2 * | 10/2005 | Kuo | G06F 13/387 710/107 |
| 2004/0008725 | A1 * | 1/2004 | McNamara | G06F 13/4291 370/466 |
| 2004/0128565 | A1 * | 7/2004 | Horigan | G06F 1/26 713/300 |
| 2007/0208527 | A1 * | 9/2007 | Lu | G01R 31/31907 702/120 |
| 2010/0017553 | A1 * | 1/2010 | Laurencin | G06F 13/4027 710/307 |
| 2010/0235555 | A1 * | 9/2010 | Nguyen | G06F 13/4027 710/110 |

(Continued)

OTHER PUBLICATIONS

System Management Bus (SMBus) Specification, Version 3.0, Dec. 2014, 85 pgs.

(Continued)

*Primary Examiner* — Christopher B Shin

(74) *Attorney, Agent, or Firm* — Law Offices of Maximilian R. Peterson

(57) ABSTRACT

An apparatus includes a circuit that includes a communication circuit to communicate information via a link using two communication modes. In the first communication mode, the communication circuit communicates information using a communication protocol. In the second communication mode, the communication circuit communicates information without triggering communication using the communication protocol.

20 Claims, 12 Drawing Sheets

(56) References Cited

U.S. PATENT DOCUMENTS

| | | | | |
|---|---|---|---|---|
| 2014/0046595 | A1* | 2/2014 | Segawa | G01C 21/34 701/541 |
| 2014/0372642 | A1* | 12/2014 | Sengoku | G06F 13/4291 710/105 |
| 2015/0095537 | A1* | 4/2015 | Sengoku | G06F 13/4295 710/110 |
| 2016/0018873 | A1* | 1/2016 | Fernald | H04W 52/0229 713/323 |
| 2016/0214896 | A1* | 7/2016 | Cadix | C09K 8/035 |
| 2017/0109305 | A1* | 4/2017 | Liu | G06F 13/4282 |

OTHER PUBLICATIONS

UM10204, $I^2C$-bus specification and user manual, Rev. 6, Apr. 2014, 64 pgs.

* cited by examiner

COMMUNICATION APPARATUS WITH DIRECT CONTROL AND ASSOCIATED METHODS

TECHNICAL FIELD

The disclosure relates generally to electronic communication and, more particularly, to apparatus for communication apparatus with port control circuitry, and associated methods.

BACKGROUND

Modern electronics typically include a variety of elements, such as circuits, blocks, subsystems, and the like in a system or apparatus. The various elements typically communicate with one another to exchange data, status signals, control signals, and the like. To facilitate such communication, a variety of communication techniques have been developed. The techniques often use standard or standardized communication protocols to accommodate a relatively wide variety of system elements. Examples include System Management Bus (SMB or SMBus), Inter-Integrated Circuit ($I^2C$), Serial Peripheral Interface (SPI), and the like.

The description in this section and any corresponding figure(s) are included as background information materials. The materials in this section should not be considered as an admission that such materials constitute prior art to the present patent application.

SUMMARY

A variety of apparatus having communication capability and associated methods are disclosed and contemplated. According to one exemplary embodiment, an apparatus includes a circuit that includes a communication circuit to communicate information via a link using two communication modes. In the first communication mode, the communication circuit communicates information using a communication protocol. In the second communication mode, the communication circuit communicates information without triggering communication using the communication protocol.

According to another exemplary embodiment, an apparatus includes a microcontroller unit (MCU). The MCU includes a communication circuit to communicate information to/from a circuit external to the MCU using (i) a regular communication mode in which the communication circuit communicates information according to a standard communication protocol, and (ii) a direct control communication mode in which the communication circuit communicates information without triggering a start condition of the standard communication protocol.

According to another exemplary embodiment, a method of communicating information includes communicating information via a link, by using a communication circuit, in a first mode of communication. In the first communication mode the information is communicated using a communication protocol. The method further includes communication information via the link, by using the communication circuit, in a second mode of communication. In the second communication mode the information is communicated without triggering communication using the communication protocol.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

Figure 1:
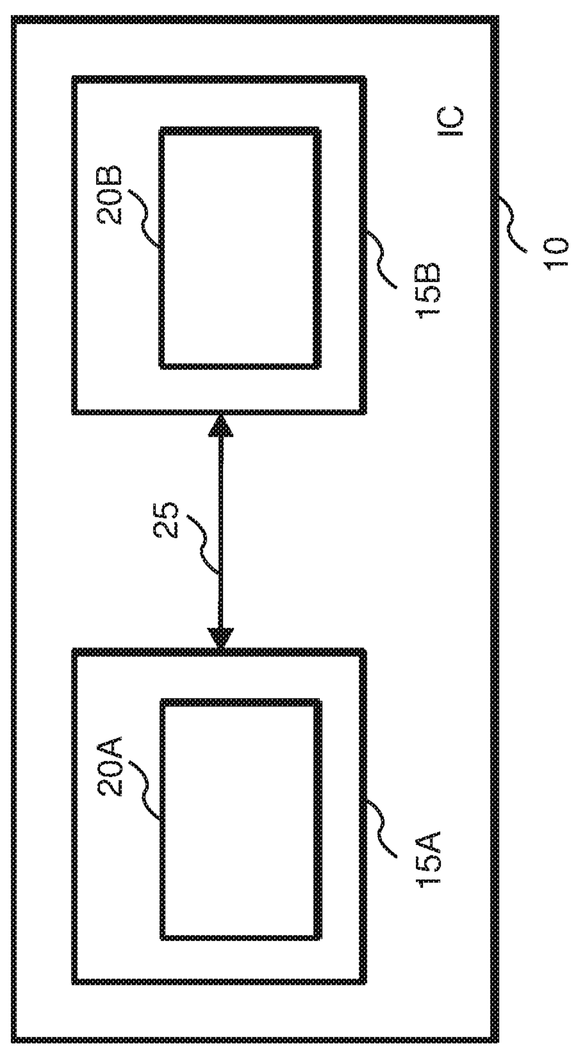
FIG. 1 illustrates a circuit arrangement for communication according to an exemplary embodiment.

The disclosed concepts relate generally to electronic communication, such as between blocks in a system, between subsystems in a system, between circuits, etc. More specifically, the disclosed concepts provide apparatus and methods for communicating using a communication protocol (regular communication mode) and communication that does not use or trigger the use (or cause triggering or use) of the communication protocol, by using direct port control mode (or, generally, direct control or direct control mode).

Put another way, the direct control mode overlays a relatively fast mode onto a standard or given or prescribed communication mode, e.g., communication according to a standardized protocol (e.g., SMBus, $I^2C$, SPI, etc.) over a communication interface. Direct control mode provides communication in a non-intrusive manner (does not trigger use of the regular or standard communication mode, for example, by not triggering a condition that normally indicates the start of regular communication, such as a condition that indicates the start or beginning of communication in the regular communication mode).

The regular communication mode typically communicates by sending and/or receiving chunks or bytes of data, for example, in the form of bursts or packets, over a period of time. At other times, the communication link is unused. Direct control mode uses the communication link during the time periods when it is not used for the regular communication mode, as described below in detail. Thus, the direct mode control can be added to, overlaid with, or serve as a superset of, an existing or standard or standardized communication protocol.

Direct control mode can use the same signals or link or bus used to effect communication during the regular communication mode. For example, in the case of SMBus (or $I^2C$), the standard or protocol uses a data signal (SMBDAT or SDA) and a clock signal (SMBCLK or SCK), typically communicated using a bus or, generally, link. Communication using direct control mode uses the same link, without entailing additional dedicated signal lines or links.

Direct control mode operates generally by driving state information onto a communication interface, link, or bus in a manner without triggering or triggering the use of the regular communication mode, e.g., by not triggering or not being recognized as a START condition in SMBus or $I^2C$. Thus, direct control mode provides a second communication mode in addition to the regular communication mode.

For example, a START condition on SMBus is a falling edge of the SDA signal when the SCK signal has a logic high value. Using direct control mode, information can be communicated using the SDA and SCK signal lines between periods or chunks of normal serial SMBus communications, as long as asserting the information onto the signal lines does not generate an SMBus START condition, i.e., a falling edge of the SDA signal when the SCK signal has a logic high value. If that condition is met (i.e., a START condition is not generated), then the two signal lines may be used to communicate information.

More specifically, using two signal lines gives rise to $2^2$, or four, distinct states (SDA and SCK pairs of binary 00, 01, 10, 10), which a circuit coupled to receive the SDA and SCK signals can interpret as communicated information. Using direct control mode provides a communication interface, such as a serial interface (e.g., SMBus) with a relatively low pin or conductor count, while providing a method for sending other information faster than allowed through the normal or regular communication mode (e.g., communication by using SMBus). Direct control mode may be applied to an existing or standard communication protocol that lacks a defined blanking period. Thus, direct control mode takes advantage of unused periods on the communication link or bus (i.e., periods not used for the regular communication mode), rather than merely rely on predefined blanking periods.

Communication techniques that use direct control mode have a number of attributes. Those attributes generally include one or more of the following: (a) reduced or minimized cost of inter-chip or inter-die or inter-circuit or inter-block communication while maintaining adequate communication bandwidth; (b) robust, relatively low-cost (lower pin-count and simpler to design); (c) relatively low power consumption; (d) relatively fast transitions between modes, such as energy modes; (e) support for standardized products (allows a product that is made to support a communication protocol, such as a standardized protocol (e.g., SMBus), while supporting a second mode of communication); (f) providing a superset of a standardized protocol, such as SMBus (which uses two signal pins; synchronous (no precision oscillator used)); (g) relative ease of modification to support relatively fast transitions while maintaining standards (e.g., SMBus, $I^2C$) compliance; (h) providing a relatively simple, standardized, communication link, such as a two-wire communication bus, between integrated circuits (ICs) or die, while providing relatively fast response times to mode-change requests; (i) may be based on a serial communication protocol that has a defined condition that signals beginning of communication (e.g., a START condition); (j) provides a direct-control mode drive capability that allows information, such as commands, to be communicated across the same signal lines that are used for communication according to a protocol, but faster than using the protocol to communicate the information; and (k) can be made invisible to the standard protocol (e.g., SMBus, $I^2C$) receiver (or other receivers in a multi-drop communication scheme or system).

The following description provides details of communication techniques using direct control mode according to exemplary embodiments. FIG. 1 illustrates an IC 10 that includes circuit 15A coupled to circuit 15B via link 25. Circuit 15A includes communication circuit 20A. Similarly, circuit 15B includes communication circuit 20B. Thus, by using communication circuit 20A, circuit 15A communicates with communication circuit 20B and, hence, with circuit 15B.

Communication between communication circuits 20A and 20B uses direct control mode. Thus, in addition to a regular communication mode, communication circuits 20A and 20B can communicate using direct control mode.

Generally, circuits 15A and 15B may include a variety of circuits, blocks, subsystems, etc. In some embodiments, circuit 15A and/or circuit 15B includes analog circuitry (in addition to digital circuitry used to implement communication circuits 20A and 20B). The analog circuitry may include bias circuits, decoupling circuits, coupling circuits, supply circuits, current mirrors, current and/or voltage sources, filters, amplifiers, converters, signal processing circuits (e.g., multipliers), detectors, transducers, simple components (transistors, resistors, capacitors, inductors), analog multiplexers (MUXs) and the like, as desired, and as persons of ordinary skill in the art will understand.

In some embodiments, circuit 15A and/or circuit 15B includes digital circuitry. The digital circuitry may include gates, digital MUXs, latches, flip-flops, registers, finite state machines (FSMs), processors, programmable logic (e.g., field programmable gate arrays (FPGAs) or other types of programmable logic), arithmetic-logic units (ALUs), standard cells, custom cells, etc., as desired, and as persons of ordinary skill in the art will understand.

In some embodiments, circuit 15A and/or circuit 15B includes mixed-signal or mixed-mode circuitry, i.e., a mixture of analog and digital circuitry. The mixed-signal circuitry may include analog to digital converters (ADCs), digital to analog converters (DACs), etc.) in addition to analog circuitry and digital circuitry, as described above, and as persons of ordinary skill in the art will understand.

Generally, in exemplary embodiments, communication circuits 20A and 20B may be implemented using a variety of circuitry, typically digital circuitry. Examples include gates, digital MUXs, latches, flip-flops, registers, finite state machines (FSMs), processors, standard cells, custom cells, etc., as desired. The choice or type of circuitry used depends on a number of factors, as persons of ordinary skill in the art will understand. Examples include design specifications, performance specifications, cost, IC area, power consumption, speed, technology (e.g., semiconductor type or circuitry) available, etc.

Link 25 may be implemented in a variety of ways. In some embodiments, link 25 may include a number of conductors (e.g., metal traces in an IC, vias, copper traces, wires, bond wires, etc.), semiconductors (e.g., polysilicon), active circuitry (e.g., buffers and/or inverters) or a mixture of any of these materials, as desired. The type of materials and/or elements used in link 25 depends on a number of factors, as persons of ordinary skill in the art will understand. Examples include design specifications, performance specifications, cost, speed, technology (e.g., material or semiconductor type or circuitry) available, etc.

In the embodiment shown in FIG. 1, communication circuits 20A and 20B communicate in a bidirectional manner. In other words, communication circuit 20A may communicate information to communication circuit 20B, and vice-versa. Thus, in such embodiments, communication circuits 20A and 20B include both transmitter circuits and receiver circuits or, generally, transceiver circuitry.

Figure 2:
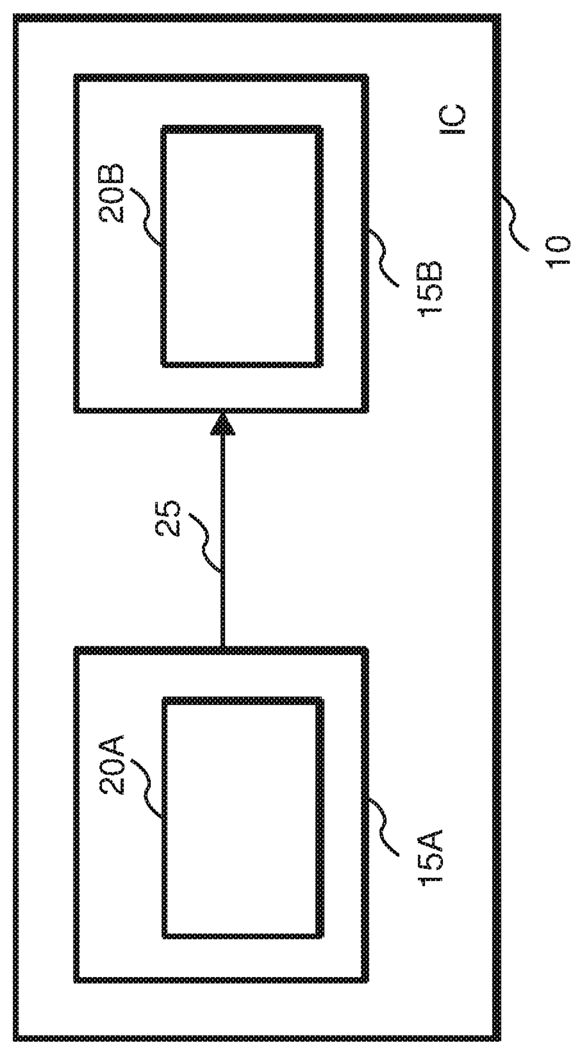
FIG. 2 depicts a circuit arrangement for communication according to another exemplary embodiment.

In some embodiments, communication occurs in one direction. FIG. 2 illustrates such a circuit arrangement. In contrast to the circuit arrangement in FIG. 1, the circuit arrangement in FIG. 2 provides communication between circuits 15A and 15B in one direction, i.e., from circuit 15A to circuit 15B. More specifically, in such embodiments, communication circuit 20A includes transmitter circuitry and communication circuit 20B includes receiver circuitry.

Figure 3:
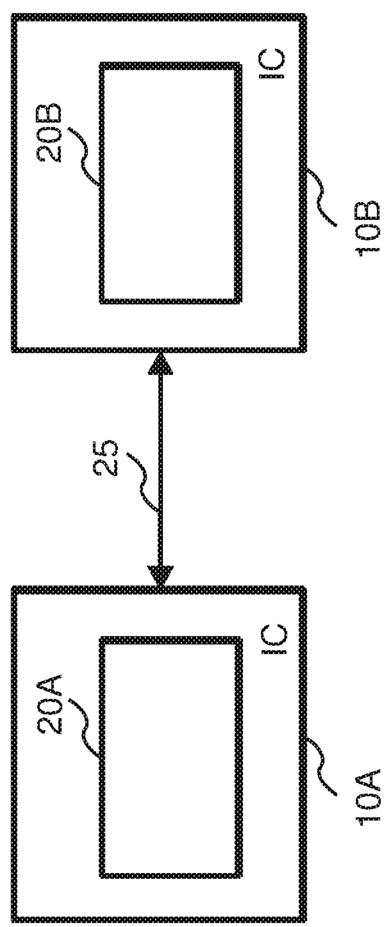
FIG. 3 shows a circuit arrangement for communication according to another exemplary embodiment.

In some embodiments, link 25 provides communication between two ICs or semiconductor die (e.g., in an MCM). FIG. 3 shows such an arrangement. More specifically, in the embodiment in FIG. 3, ICs 10A and 10B communicate with one another via link 25. In the embodiment shown, link 25 provides bidirectional communication, similar to the example shown in FIG. 1. Referring again to FIG. 3, other varieties are contemplated, such as unidirectional communication from IC 10A to IC 10B, i.e., communication circuit 20A includes transmitter circuitry and communication circuit 20B includes receiver circuitry.

Figure 4:
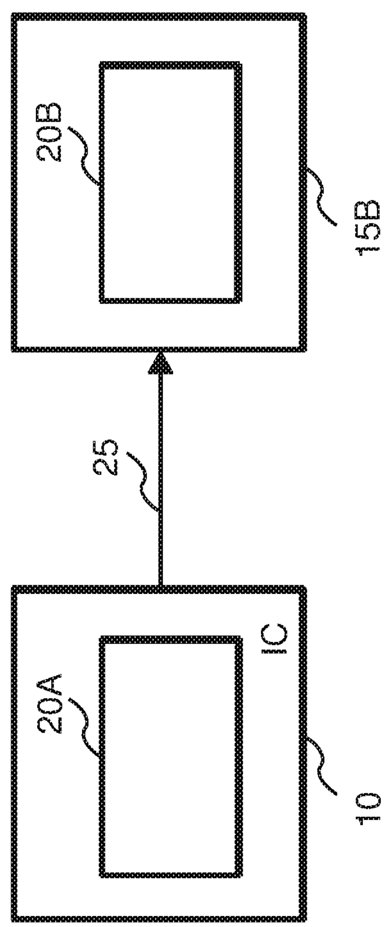
FIG. 4 depicts a circuit arrangement for communication according to another exemplary embodiment.

Communication using direct mode control is not limited to communication between ICs or within an IC. Other possibilities exist and are contemplated. For example, in some embodiments, communication circuit 20A in IC 10A may communicate with communication circuit 20B in circuit 15B that is not integrated in an IC (discrete or simple circuitry (passive components, etc.), circuit implemented on a carrier or substrate, such as a printed circuit board (PCB), etc.). FIG. 4 shows such an arrangement. Note that although the example in FIG. 4 shows unidirectional communication from communication circuit 20A to communication circuit 20B, other possibilities are contemplated, for instance, where communication between communication circuits 20A and 20B is bidirectional.

Figure 5:
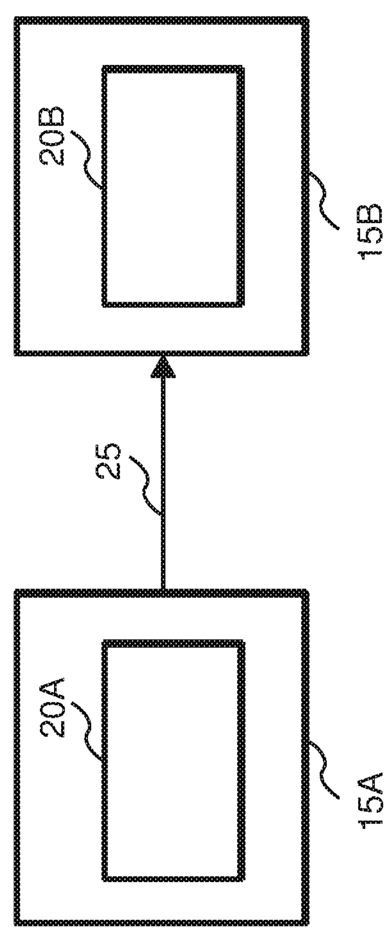
FIG. 5 illustrates a circuit arrangement for communication according to another exemplary embodiment.

As another example, in some embodiments, communication circuit 20A in circuit 15A may communicate with communication circuit 20B in circuit 15B, where neither of circuits 15A and 15B is integrated in an IC (discrete or simple circuitry such as passive components, circuit implemented on a carrier or substrate, such as a printed circuit board (PCB), etc.). FIG. 5 shows such an arrangement. Note that although the example in FIG. 5 shows unidirectional communication from communication circuit 20A to communication circuit 20B, other possibilities are contemplated, for instance, where communication between communication circuits 20A and 20B is bidirectional.

Figure 6:
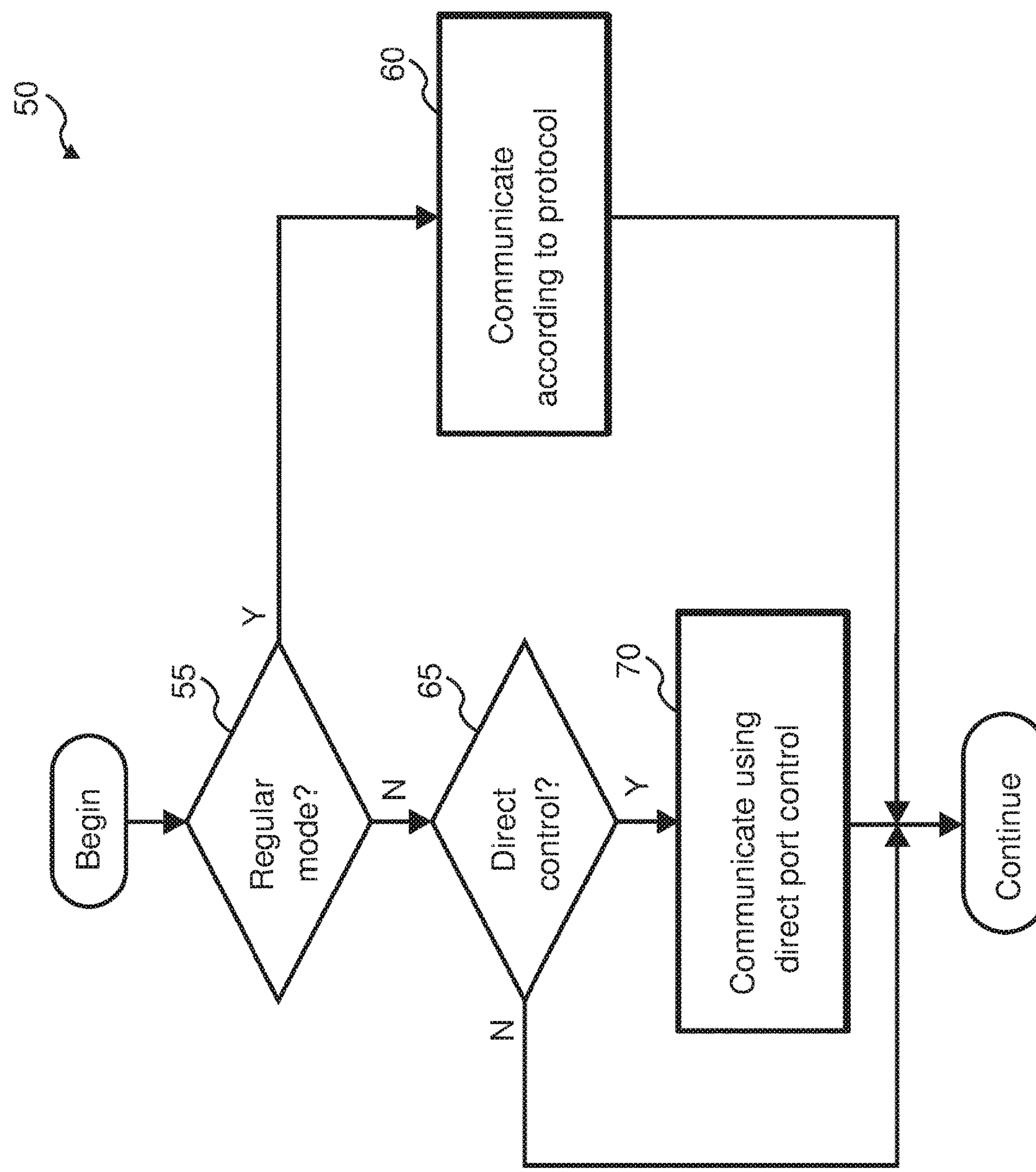
FIG. 6 depicts a flow diagram for a process of electronic communication according to an exemplary embodiment.

As noted above, generally, exemplary embodiments provide communication according to both a regular communication mode and a direct control mode. FIG. 6 depicts a flow diagram for a process 50 of communication according to an exemplary embodiment.

At 55, a determination is made whether communication using regular communication mode is desired or intended. If so, at 60, communication using regular communication mode (according to a given or desired protocol) is performed. If not, at 65, a determination is made whether communication using direct control mode is desired or intended. If so, at 60, communication using direct control (or direct port) mode is performed.

Note that a variety of alternative processes are contemplated and are possible. For example, in some embodiments, block 65 may be omitted. In other words, if communication using regular communication mode is not desired or intended, communication using direct control mode is assumed and performed (e.g., at block 70). As another example, in some embodiments, if communication using regular communication mode is not taking place, communication using direct control mode may take place, as long as doing so does not trigger the regular communication mode.

As another example, if communication using regular communication mode is not taking place, communication using direct control mode may take place, and periodic checks are made to determine whether communication using regular communication mode is desired. If so, communication using direct mode control is interrupted or paused in order for communication using regular communication mode to be performed.

Figure 7:
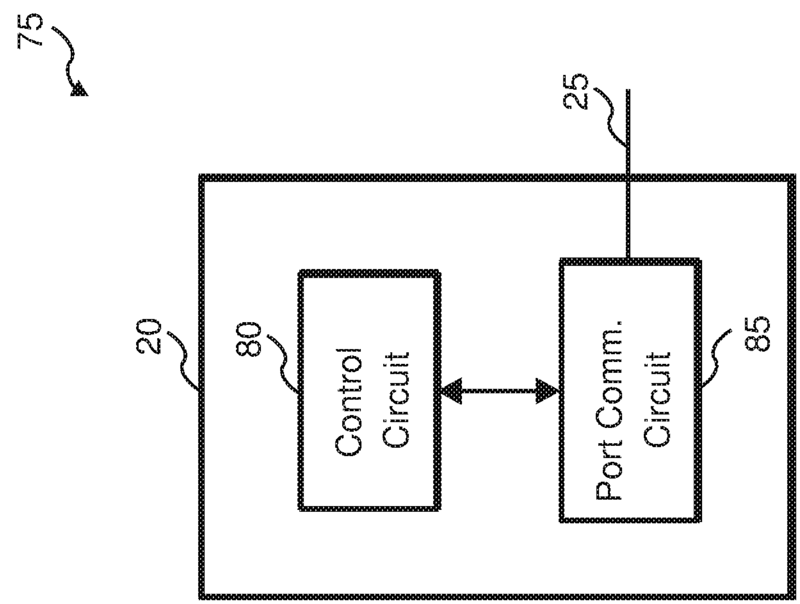
FIG. 7 illustrates a circuit arrangement for an apparatus having communication capability according to an exemplary embodiment.
Figure 8:
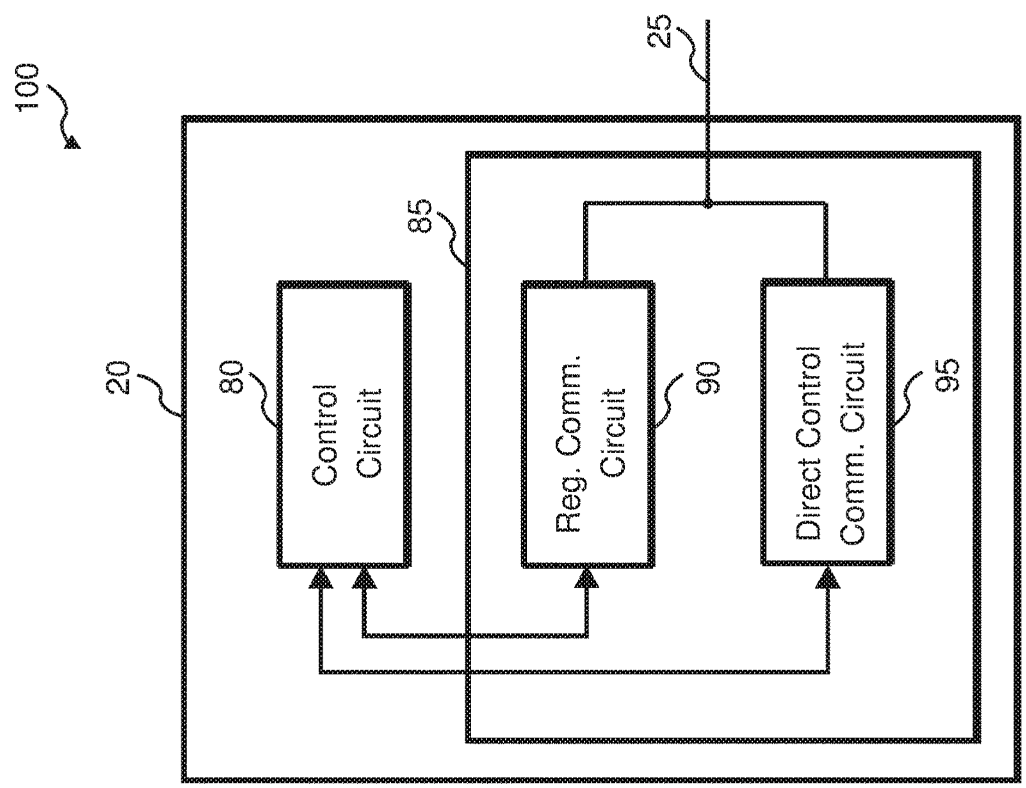
FIG. 8 shows more details of the apparatus in FIG. 7.

Communication circuit 20A or 20B (generally, communication circuit 20) may be implemented in a variety of ways, as desired, and as persons of ordinary skill in the art will understand. FIGS. 7-8 provide details of communication circuit 20 according to exemplary embodiments. Note that the circuitry shown in FIGS. 7-8, specifically, communication circuit 20, may be used to implement communication circuits 20A and 20B, discussed above.

Referring to FIG. 7, a circuit arrangement 75 for communication circuit 20 is shown. Communication circuit 20 includes control circuit 80 and port communication circuit 85. Port communication circuit 85 couples to link 25. Thus, port communication circuit 85 includes circuitry to provide communication with other communication circuit(s), whether in the regular communication mode or in the direct control mode, as described above.

Control circuit 80 controls the operation of port communication circuit 85. More specifically, control circuit 80 controls whether port communication circuit 85 communicates information in the regular communication mode or in the direct control mode. Control circuit 80 communicates information with port communication circuit 85 via a set of signals, for instance, over a bidirectional link.

The information communicated with port communication circuit 85 may include a variety of items or information, such as the communication mode to be used (regular versus direct control), data or information to be communicated (in instances where port communication circuit 85 includes transmit circuitry), data or information received (in instances where port communication circuit 85 includes receive circuitry), status information, and other control information (e.g., whether port communication circuit 85 is active, in a sleep or low-power mode, etc.).

Control circuit 80 and port communication circuit 85 may be implemented in a variety of ways, as desired. Generally, choice or type of circuitry used depends on a number of factors, as persons of ordinary skill in the art will understand. Examples include design specifications, performance specifications, cost, IC area, power consumption, speed, technology (e.g., semiconductor type or circuitry) available, etc.

In exemplary embodiments, such as the embodiment in FIG. 7, control circuit 80 and port communication circuit 85 may be implemented using digital circuitry, such as gates, digital MUXs, latches, flip-flops, registers, FSMs, programmable logic, processors, ALUs, standard cells, custom cells, etc., as desired, and as persons of ordinary skill in the art will understand. In addition, analog circuitry or mixed-signal circuitry or both may be included, for instance, power converters, discrete or simple devices such as passive components, and the like, as desired.

FIG. 8 includes circuit arrangement 100, which illustrates further details of port communication circuit 85. Specifically, port communication circuit 85 includes regular communication circuit 90 and direct control communication circuit 95. Under the supervision of control circuit 80, regular communication circuit 90 provides communication via link 25 in the regular communication mode. Conversely, under the supervision of control circuit 80, direct control communication circuit 95 provides communication via link 25 in the direct control mode.

In exemplary embodiments, regular communication circuit 90 and direct control communication circuit 95 may provide unidirectional or bidirectional communication, as desired. More specifically, regular communication circuit 90 and direct control communication circuit 95 may include transmit circuitry, receive circuitry, or both, as discussed above.

In exemplary embodiments, such as the embodiment in FIG. 8, regular communication circuit 90 and direct control communication circuit 95 may be implemented using digital circuitry, such as gates, digital MUXs, latches, flip-flops, registers, FSMs, programmable logic, processors, ALUs, standard cells, custom cells, etc., as desired, and as persons of ordinary skill in the art will understand. In addition, analog circuitry or mixed-signal circuitry or both may be included, for instance, power converters, discrete or simple devices such as passive components, and the like, as desired.

Figure 9:
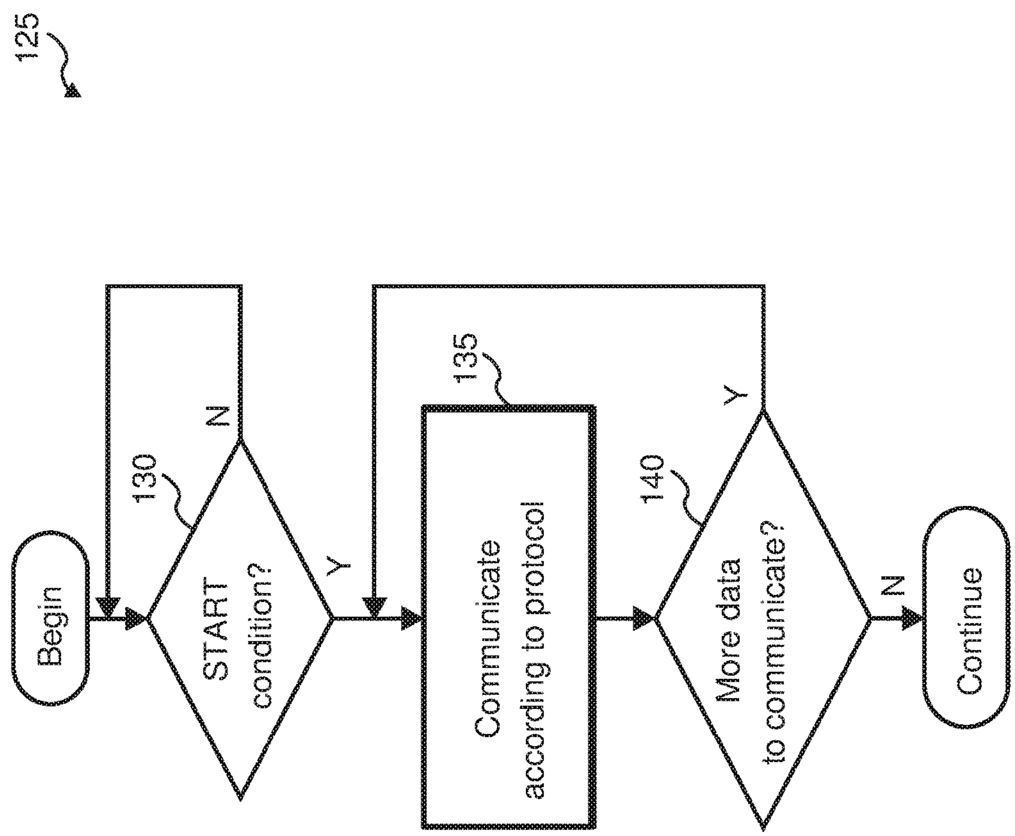
FIG. 9 illustrates a flow diagram for a process for communicating information using the regular communication mode according to an exemplary embodiment.
Figure 10:
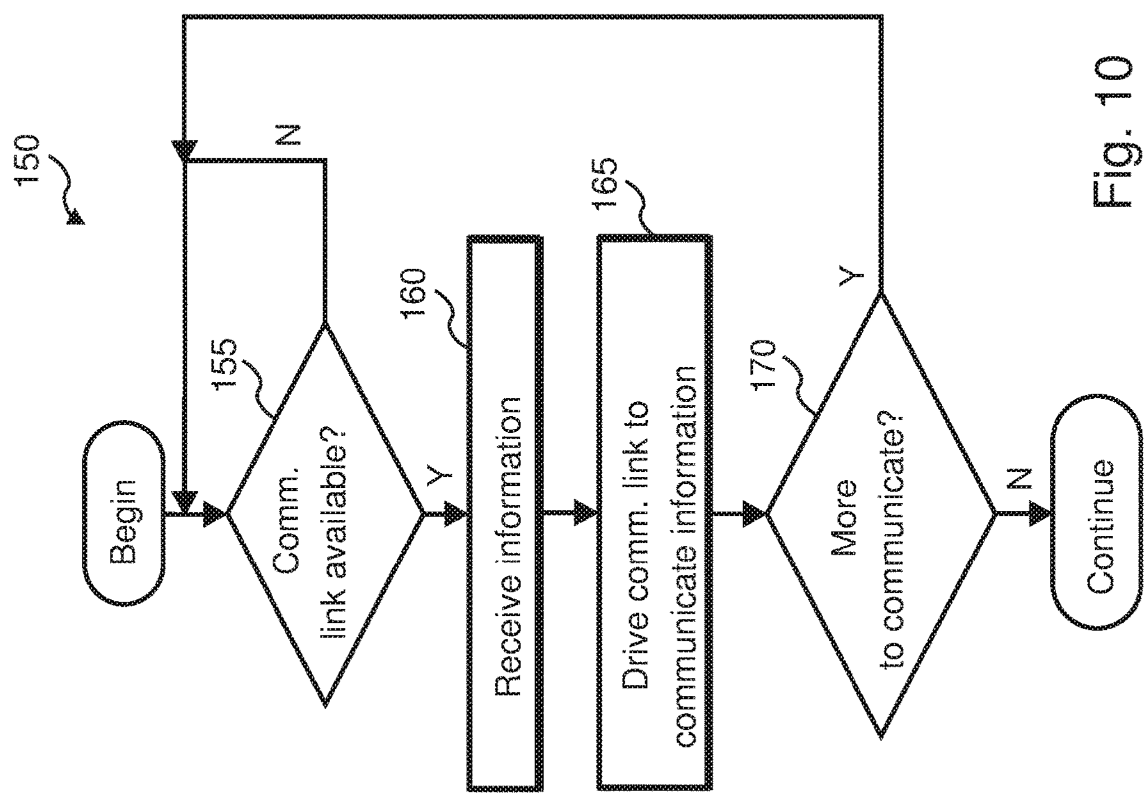
FIG. 10 depicts a flow diagram for a process of communication using direct control mode according to an exemplary embodiment.

FIGS. 9 and 10 provide flow diagrams for communicating information using the regular and direct control modes of communication. More specifically, FIG. 9 illustrates a flow diagram for a process 125 for communicating information using the regular communication mode according to an exemplary embodiment, for example, the embodiment shown in FIG. 8, which includes regular communication circuit 90.

Referring again to FIG. 9, at 130, a check is made whether a START condition (described above) exists, for example, whether the state of signals on link 25 indicates a START condition. If not, control returns to check again for the occurrence of a START condition. The check at 130 may also check if a request to generate a START condition exists.

If, however, a START condition exists (or a request to generate a START condition exists), at 135 communication according a desired or standard protocol (regular mode communication) is performed. At 140, a check is made whether more data are to be communicated (e.g., sent to a communication circuit 20). If so, control returns to 135 to communication additional information. Otherwise, the process continues with additional blocks, if any.

FIG. 10 depicts a flow diagram for a process 150 of communication using direct control mode according to an exemplary embodiment, for example, the embodiment shown in FIG. 8, which includes direct control communication circuit 95. At 155, a check is made whether the communication link (e.g., link 25) is available, e.g., idle. For example, link 25 may be considered unavailable during the period of time between detecting a START condition and detecting a STOP condition. If available, at 160, information is received from the communication link, using the direct control mode. At 165, information is transmitted via the communication link, using the direct control mode. At 170, a check is made whether more data are to be communicated (e.g., sent to a communication circuit 20). If so, control returns to 155. Otherwise, the process continues with additional blocks, if any.

Note that a variety of modifications to process 150 are contemplated. For example, in some embodiments, at 155, rather than checking for START/STOP conditions, other criteria may be used to determine whether the communication link is available, for instance, checking for any signal activity on the communication link. As another example, in some embodiments, the order of blocks 160 and 165 may be reversed (i.e., receiving information may occur before transmitting information). As another example, in some embodiments, one of blocks 160 and 165 may be omitted (e.g., unidirectional communication, where either information is received (block 160) or information is transmitted (block 165)).

Figure 11:
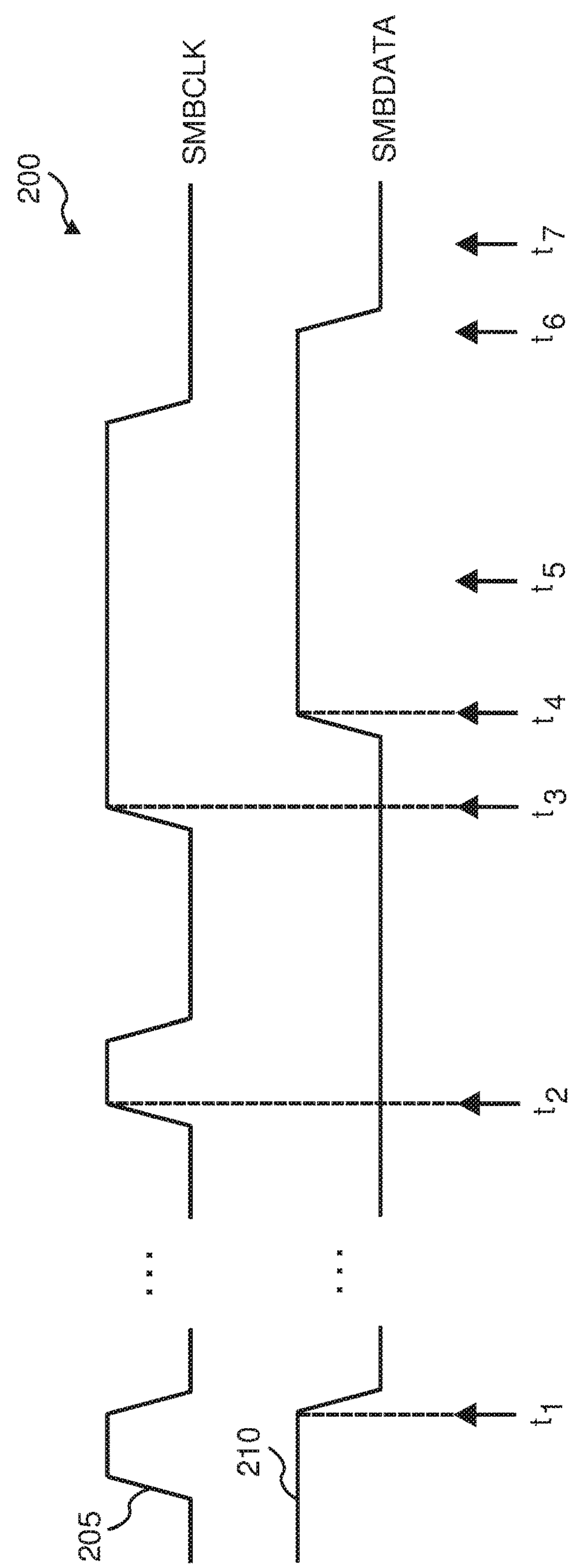
FIG. 11 shows a timing diagram for communication according to an exemplary embodiment.

FIG. 11 shows a timing diagram 200 for communication according to an exemplary embodiment. In the embodiment shown, communication in the regular mode is performed according to the SMBus (or $I^2C$) protocol. More specifically, waveform 205 corresponds to an SMBCLK signal, discussed above. Conversely, waveform 210 corresponds to an SMBDAT signal, discussed above.

Referring again to FIG. 11, at time t1, the SMBCLK signal has a logic high value and the SMBDAT signal makes a logic high to logic low (high to low) transition, i.e., indicating a START condition. Following time t1, communication occurs using the regular communication mode.

At time t2, an acknowledge (ACK) event occurs to acknowledge communication of information according to the regular communication mode. This event is characterized, during a particular phase in the protocol, by the SMBCLK signal having a logic high value, and the SMBDAT signal having a logic low value. Additional information may be communicated using the regular communication mode, as desired. The end of the communication may have an ACK event, as described above.

At time t3, i.e., with the rising edge of the SMBCLK signal following an ACK event, a direct mode enable signal (DIRECTEN) may be set (e.g., in control circuit 80, by a host (not shown)). The setting of the direct mode enable signal indicates that communication via the direct control mode is desired.

At time t4, i.e., the rising edge of the SMBDAT signal while the SMBCLK signal has a logic high value (indicating a STOP condition for the regular communication protocol), the setting of the direct mode enable signal takes effect. More specifically, communication according to the direct mode control may commence or commences at or following time t4.

At time t5, the SMBCLK and SMBDAT signals are driven (e.g., by direct control communication circuit 95) to logic high values. This condition may correspond to one state or communicated value in the direct control mode, for instance, a STATE0. In some embodiments, various states in the direct control mode may be used for control of various conditions, such as control of the power or energy mode of an IC that includes communication circuit 20. As an example, STATE0 may correspond to a regular, normal, or high power (full power) mode of operation of such an IC.

At time t6 (or before time t6, between t5 and t6), the SMBCLK and SMBDAT signals are driven (e.g., by direct control communication circuit 95) to logic low and logic high values, respectively. This condition may correspond to another state or communicated value in the direct control mode, for instance, a STATE1. Continuing with the example above, STATE1 may correspond to a medium or low-power (less than normal or full power) mode of operation of such an IC.

At time t7 (or before time t7, between t6 and t7), the SMBCLK and SMBDAT signals are driven (e.g., by direct control communication circuit 95) to logic low values. This condition may correspond to another state or communicated value in the direct control mode, for instance, a STATE2. Continuing with the example above, STATE2 may correspond to an even lower power (less power consumption than the medium or low-power state, such as deep low-power, sleep, hibernate, etc.) mode of operation of such an IC.

When transitioning from a certain state of the communication link during direct control mode to another state during direct control mode, generation of a START condition is avoided (i.e., triggering of a START condition is avoided) by making a temporary transition to an intermediate direct-control state. For example, FIG. 11 shows communication using direct control mode making a transition from STATE0 to STATE2 by first passing through STATE1. This sequence avoids the START condition that could otherwise be generated due to a transition from STATE0 directly to STATE2. For example, during a transition from STATE0 directly to STATE2, a START condition could be generated if the SMBDAT signal achieved a low state before the SMBCLK signal achieved a low state, possibly due to unbalanced signal slew times or propagation delays.

Figure 12:
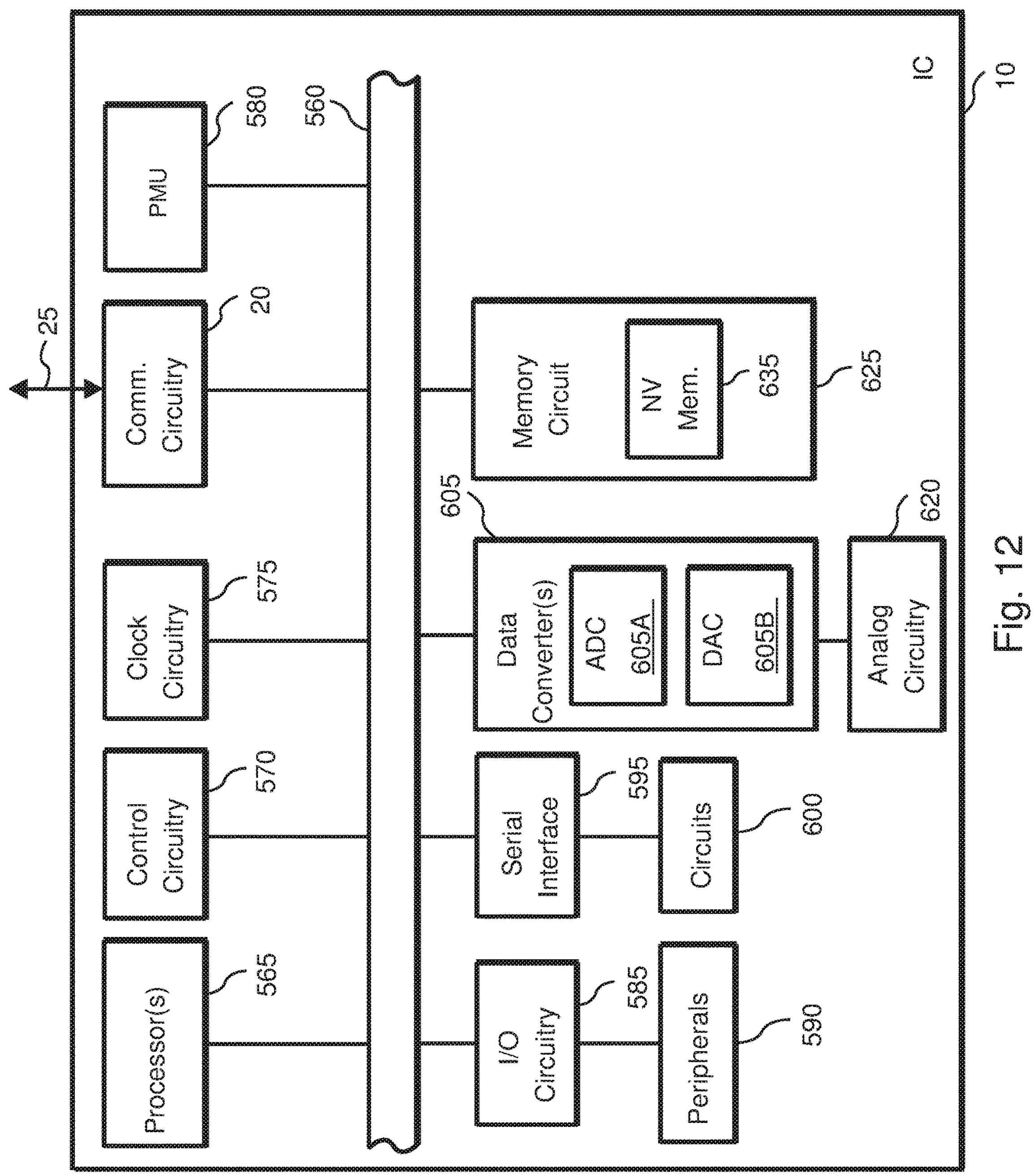
FIG. 12 illustrates a block diagram of a microcontroller unit (MCU) that includes communication circuit 20 according to an exemplary embodiment.

Communication circuitry and techniques according to the disclosure may be applied to a variety of circuitry, ICs, systems, subsystems, etc., as noted above. FIG. 12 illustrates a block diagram of an IC 10, a microcontroller unit (MCU), that includes communication circuit 20 according to an exemplary embodiment.

IC 10 includes a number of blocks (e.g., processor(s) 565, data converter(s) 605, I/O circuitry 585, etc.) that communicate with one another using a link 560. In exemplary embodiments, link 560 may constitute a coupling mechanism, such as a bus, a set of conductors or semiconductors for communicating information, such as data, commands, status information, and the like.

IC 10 includes link 560 coupled to one or more processors 565, clock circuitry 575, power management circuitry or PMU 580, etc. In some embodiments, processor(s) 565 may include circuitry or blocks for providing computing functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 10. Clock circuitry 575 may also control the timing of operations that use link 560. In some embodiments, clock circuitry 575 may provide one or more clock signals via link 560 to other blocks in IC 10.

In some embodiments, PMU 580 may reduce an apparatus's (e.g., IC 10 or another apparatus coupled to IC 10 via link 25) clock speed, turn off the clock, reduce power, turn off power, or any combination of the foregoing with respect to part of a circuit or all components of a circuit. Further, PMU 580 may turn on a clock, increase a clock rate, turn on power, increase power, or any combination of the foregoing in response to a transition from an inactive state to an active state (such as when processor(s) 565 make a transition from a low-power or idle or sleep state to a normal operating state).

In some embodiments, PMU 580 has the capability of controlling or setting various modes of operation of IC 10 or another apparatus (e.g., another IC linked to IC 10 via link 25). The modes of operation may include various states or levels of power consumption, such as normal (full power) mode, medium power mode, low-power mode, etc., as described above.

Referring again to FIG. 12, link 560 may couple to one or more circuits 600 through serial interface 595. Through serial interface 595, one or more circuits coupled to link 560 may communicate with circuits 600. Circuits 600 may communicate using one or more serial protocols, e.g., SMBUS, $I^2C$, SPI, and the like, as persons of ordinary skill in the art will understand.

Link 560 may couple to one or more peripherals 590 through I/O circuitry 585. Through I/O circuitry 585, one or more peripherals 590 may couple to link 560 and may therefore communicate with other blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to IC 10. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. Note that in some embodiments, such peripherals may be external to IC 10, as described above.

Link 560 may couple to analog circuitry 620 via data converter(s) 605. Data converter(s) 605 may include one or more ADC(s) 605A and/or one or more DAC(s) 605B. The ADC(s) 605A receive analog signal(s) from analog circuitry 620, and convert the analog signal(s) to a digital format, which ADC(s) 605A communicate to one or more blocks coupled to link 560.

Analog circuitry 620 may include a wide variety of circuitry that provides and/or receives analog signals. Examples include sensors, transducers, and the like, as persons of ordinary skill in the art will understand. In some embodiments, analog circuitry 620 may communicate with circuitry external to IC 10 to form more complex systems, sub-systems, control blocks, and information processing blocks, as desired.

Control circuitry 570 couples to link 560. Thus, control circuitry 570 may communicate with and/or control the operation of various blocks coupled to link 560. In addition, control circuitry 570 may facilitate communication or cooperation between various blocks coupled to link 560.

In some embodiments, control circuitry 570 may initiate or respond to a reset operation. The reset operation may cause a reset of one or more blocks coupled to link 560, of IC 10, etc., as persons of ordinary skill in the art will understand. For example, control circuitry 570 may cause PMU 580, communication circuit 20, or generally any of the blocks in IC 10, to reset to an initial state.

In exemplary embodiments, control circuitry 570 may include a variety of types and blocks of circuitry. In some embodiments, control circuitry 570 may include logic circuitry, finite-state machines (FSMs), or other circuitry to perform a variety of operations, such as the operations described above. Controller 80 may be included in control circuitry 570, as desired.

Communication circuitry 20 couples to link 560 and also to circuitry or blocks (not shown) external to IC 10. Through communication circuitry 20, various blocks coupled to link 560 (or IC 10, generally) can communicate with the external circuitry or blocks (not shown) via one or more communication protocols (regular communication mode) and via direct control mode, as described above.

As noted, memory circuit 625 couples to link 560. Consequently, memory circuit 625 may communicate with one or more blocks coupled to link 560, such as processor(s) 365, control circuitry 570, I/O circuitry 585, etc. Memory circuit 625 provides storage for various information or data in IC 10, such as operands, flags, data, instructions, and the like, as persons of ordinary skill in the art will understand. Memory circuit 625 may support various protocols, such as double data rate (DDR), DDR2, DDR3, and the like, as desired.

Memory circuit 625 may include a variety of memory circuits or blocks. In the embodiment shown, memory circuit 625 includes non-volatile (NV) memory 635. In addition, or instead, memory circuit 625 may include volatile memory (not shown). NV memory 635 may be used for storing information related to performance or configuration of one or more blocks in IC 10. For example, NV memory 635 may store configuration information related to the operation of PMU 580 (e.g., various power modes, such as described above), communication circuit 20, etc., as desired.

A variety of alternatives and modifications to the embodiments described above are contemplated and possible. In some embodiments, a receiver (e.g., part of direct control communication circuit 95 in FIG. 8) can ignore any direct mode state on the communication link shorter than a given duration. This attribute allows the direct-mode transmitter (e.g., part of a counterpart direct control communication circuit 95) to briefly pass (or make a transition) through intermediate states to avoid generating a START condition, without the direct-mode receiver acting on the detection of the intermediate state.

In some embodiments, the direct control mode state values or states (e.g., STATE0, STATE1, etc.) are assigned such that responding to an intermediate state is an acceptable or valid behavior for communication circuit 20. For example, if STATE0 commanded a power management IC to enter the high-power state, STATE1 to enter the medium-power state, and STATE2 to enter low-power state, it may be acceptable for the power management IC to act on all direct control mode states detected on the link. In this case, passing through the intermediate STATE1 (see, for example, FIG. 11), causing the power IC to transition from high- to low-power state by passing through its medium-power state, may be an acceptable behavior.

In some embodiments, information received in direct mode may be represented by a sequence of direct-mode values present on the communication link, as opposed to individual direct-mode values. In other words, individual direct-mode values or states may be captured or stored, and a combination or sequence of the individual values or states may be interpreted as the communicated information.

One application of the disclosed concepts is configuration and control of a power management IC. A desired communication protocol, such as serial SMBus communications, can be used in the regular communication mode to configure the IC, which is generally not time-critical, while the relatively fast (faster than communication in the regular mode) direct control mode can be used to command the IC to switch between preconfigured operating states, such as OFF, low-power mode, high-power mode, etc.

In some embodiments, the power management IC can provide a set of state configuration registers which define how each direct control mode value detected on the SMBus signals is interpreted. In some embodiments, the IC can also provide a direct-mode enable bit which, when set through normal SMBus traffic, enables direct-control mode, as described above. The enablement of direct-control mode should take affect after completion of the SMBus transaction to avoid values transmitted during the remainder of the SMBus transaction from being interpreted as direct control values. (As described above, FIG. 11 shows this sequence of events.)

In some embodiments, an apparatus (such as a power management IC) may use direct mode control to control power consumption of various circuits, such as peripherals (whether internal or external to the IC). For instance, in the event of detecting (or being notified of) an imminent power failure, to reduce power consumption, the power management IC uses use direct control mode to change the power consumption profiles (e.g., turn off) various peripherals, such as backlights, audio circuits, or other features or circuit(s) that have relatively high power consumption. Doing so preserves energy, such as from decoupling capacitors or batteries, which can be made available to tasks such as saving data or state of various circuits, as desired. Given that the direct control mode provides faster communication than does the regular communication mode, the actions taken to reduce power consumption may be taken with higher speed, thus more quickly reducing the overall power consumption of the apparatus.

In some embodiments, direct control mode automatically terminates upon detection of a START condition, or direct control mode may simply be inhibited during a SMBus transaction initiated by a START condition and terminated by a STOP condition (or a timeout period after SMBus traffic ends). Furthermore, in some embodiments, the direct control mode receiver (e.g., part of direct control communication circuit 95) may, upon detection of a START condition, remember or retrieve the immediately preceding direct control mode state of the communication link and continue acting on that state until communication using the detected regular communication mode is complete, at which time the receiver may continue receiving information from the link using direct control mode communication. Still further, in some embodiments, the direct control mode receiver may, upon detection of a START condition, revert to a predetermined or preprogrammed direct control state and continue acting on that state until communication using the detected regular communication mode is complete, at which time the receiver may continue receiving information from the link using direct control mode communication.

In some embodiments, communication circuit 20 uses serial communication (e.g., SMBus, $I^2C$) to communicate information using link 25. In some embodiments, communication circuit 20 uses parallel communication to communicate information using link 25.

As noted, one may apply the disclosed concepts effectively to various apparatus, such as ICs. Examples described in this document constitute merely illustrative applications, and are not intended to limit the application of the disclosed concepts to other apparatus by making appropriate modifications. For instance, rather than using an MCU as shown in FIG. 12, other types of ICs or MCMs may be used, as desired.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus comprising:

a first circuit comprising:

a first communication circuit to communicate information via a link using first and second communication modes, wherein in the first communication mode the first communication circuit communicates information using a communication protocol, and wherein in the second communication mode the first communication circuit communicates information without triggering communication using the communication protocol, and wherein the second communication mode comprises a direct control communication mode.

2. The apparatus according to claim 1, wherein the first communication circuit comprises:

a regular communication circuit to communicate information in the first communication mode; and a direct control mode communication circuit to communicate information in the second communication mode.

3. The apparatus according to claim 2, wherein the first communication circuit further comprises a control circuit coupled to the regular communication circuit and the direct control mode communication circuit.

4. The apparatus according to claim 1, wherein the communication protocol comprises a serial communication protocol.

5. The apparatus according to claim 4, wherein the serial communication protocol comprises System Management Bus (SMBus), Inter-Integrated Circuit ($I^2C$), or Serial Peripheral Interface (SPI).

6. The apparatus according to claim 1, further comprising:

a second circuit comprising:

a second communication circuit to communicate information with the first communication circuit via the link, the second communication circuit using first and second communication modes, wherein in the first communication mode the second communication circuit communicates information using the communication protocol, and wherein in the second communication mode the second communication circuit communicates information without triggering communication using the communication protocol.

7. The apparatus according to claim 6, wherein the first communication circuit communicates information to the second communication circuit by using the second communication mode in order to change a power state of the second circuit.

8. The apparatus according to claim 6, wherein the first communication circuit communicates information to the second communication circuit by using the second communication mode in order to change a power state of the second circuit from a first state to a second state by making a transition through an intermediate state in order to avoid triggering communication via the first communication mode.

9. An apparatus comprising:

a microcontroller unit (MCU) comprising:

a first communication circuit to communicate information to/from a first circuit external to the MCU using (i) a regular communication mode in which the first communication circuit communicates information according to a standard communication protocol, and (ii) a direct control communication mode in which the first communication circuit communicates information without triggering a start condition of the standard communication protocol.

10. The apparatus according to claim 9, further comprising a second circuit in the MCU, the second circuit comprising a second communication circuit coupled to the first communication circuit via a link.

11. The apparatus according to claim 9, wherein the standard communication protocol comprises a System Management Bus (SMBus) protocol, and wherein the first communication circuit communicates information without triggering a START condition of the SMBus protocol when using the direct control communication mode.

12. The apparatus according to claim 9, wherein the MCU is integrated in a first semiconductor die in a multi-chip module (MCM), and the first circuit is integrated in a second semiconductor die in the MCM, the first circuit comprising a second communication circuit coupled to the first communication circuit via a link.

13. A method of communicating information, the method comprising:

communicating information via a link, by using a first communication circuit, in a first mode of communication, wherein in the first communication mode the information is communicated using a communication protocol; and communicating information via the link, by using the first communication circuit, in a second mode of communication, wherein in the second communication mode the information is communicated without triggering communication using the communication protocol, and wherein in the second communication mode the information is communicated using a direct communication mode without using the communication protocol.

14. The method according to claim 13, wherein the communication protocol comprises a serial communication protocol.

15. The method according to claim 14, wherein the serial communication protocol comprises System Management Bus (SMBus), Inter-Integrated Circuit ($I^2C$), or Serial Peripheral Interface (SPI).

16. The method according to claim 13, further comprising:

communicating information with the first communication circuit via the link, by using a second communication circuit, in a first mode of communication, wherein in the first communication mode the information is communicated using the communication protocol; and communicating information with the first communication circuit via the link, by using the second communication circuit, in a second mode of communication, wherein in the second communication mode the information is communicated without triggering communication using the communication protocol.

17. The method according to claim 15, further comprising communicating information from the first communication circuit to the second communication circuit by using the second communication mode in order to change a power state of the second circuit.

18. The method according to claim 17, wherein communicating information from the first communication circuit to the second communication circuit by using the second communication mode in order to change the power state of the second communication circuit further comprises changing the power state of the second communication circuit from a first state to a second state by making a transition through an intermediate state in order to avoid triggering communication via the first communication mode.

19. The apparatus according to claim 9, wherein the first communication circuit comprises:

a regular communication circuit to communicate information in the regular communication mode; and a direct control mode communication circuit to communicate information in the direct control communication mode.

20. The apparatus according to claim 19, wherein the first communication circuit further comprises a control circuit coupled to the regular communication circuit and the direct control mode communication circuit.

* * * * *